United States Patent [19]

Ciliberto et al.

[11] 4,288,460
[45] Sep. 8, 1981

[54] NON-CAKING, WATER-SOLUBLE, GRANULAR COATED FOOD INGREDIENT

[75] Inventors: Paul Ciliberto, Slate Hill; Stanley Kramer, Middletown, both of N.Y.

[73] Assignee: Balchem Corporation, Slate Hill, N.Y.

[21] Appl. No.: 41,804

[22] Filed: May 24, 1979

[51] Int. Cl.$^3$ .................. A23L 1/04; A23L 2/00; A23L 3/34; C09K 3/00
[52] U.S. Cl. .................... 426/96; 426/590; 426/576; 426/650; 426/321; 252/382; 252/316
[58] Field of Search ........... 426/576, 96, 443, 590, 426/321, 650, 302, 382; 252/381, 384

[56] References Cited

U.S. PATENT DOCUMENTS

| | | | |
|---|---|---|---|
| 1,811,809 | 6/1931 | Schwarzkopf | 424/70 |
| 2,183,173 | 12/1939 | Segura | 426/96 |
| 2,238,149 | 4/1941 | Aeckerle | 426/321 |
| 2,332,735 | 10/1943 | Lyons | 426/99 |
| 2,539,012 | 1/1951 | Diamond et al. | 426/97 |
| 2,606,876 | 8/1952 | Kamlet et al. | 252/384 |
| 2,819,971 | 1/1958 | Gunthardt | 426/576 |
| 2,956,926 | 10/1960 | Grief | 424/37 |
| 2,970,163 | 1/1961 | Gottesman et al. | 260/435 R |
| 3,009,810 | 11/1961 | Raffensperger et al. | 426/590 |
| 3,082,154 | 3/1963 | Allan | 424/38 |
| 3,131,068 | 4/1964 | Grief et al. | 426/96 |
| 3,657,182 | 4/1972 | Jolly | 260/33.4 R |
| 3,663,271 | 5/1972 | Gergely | 428/403 |
| 3,716,493 | 2/1973 | Acker et al. | 252/317 |
| 3,755,529 | 8/1973 | Procyk | 425/591 |
| 3,830,738 | 8/1974 | Cottrell | 252/4 |
| 3,850,971 | 11/1974 | Termin et al. | 260/448.8 R |
| 3,909,461 | 9/1975 | Culmone et al. | 252/539 |
| 3,975,280 | 8/1976 | Hachmann et al. | 252/102 |
| 3,975,296 | 8/1976 | Kaplan | 252/383 |
| 4,141,998 | 2/1979 | Ziemke et al. | 426/650 |

OTHER PUBLICATIONS

Hawley, G. G.; *The Condensed Chemical Dictionary*, Eighth Edition, 1971, p. 783.

*Primary Examiner*—Joseph M. Golian
*Assistant Examiner*—Elizabeth J. Curtin
*Attorney, Agent, or Firm*—Harold J. Birch

[57] ABSTRACT

Granular water-soluble food ingredients which deteriorate upon exposure to the atmosphere, such as hygroscopic organic acids which cake or coloring agents which oxidize, are protected by encapsulation in a protective coating consisting essentially of 5–37% a fatty acid derivative selected from the group consisting of polyoxyethylene sorbitan monooleate, polyoxyethylene sorbitan monostearate and lecithin, 15–56% propylene glycol and 38–62% flow agent, e.g., fumed silica or carboxymethylcellulose. The resulting coated particles have a long shelf life and still are substantially instantaneously soluble in water.

14 Claims, No Drawings

NON-CAKING, WATER-SOLUBLE, GRANULAR COATED FOOD INGREDIENT

BACKGROUND OF THE INVENTION

Water-soluble organic acids are common ingredients of food compositions where they serve as acidulants, flavoring agents and/or preservatives. Common applications for such materials are in gelatin desert mixes and in powdered beverage mixes. Frequently utilized acids include citric, malic, tartaric and ascorbic. However, such acids have pronounced hygroscopic tendencies and absorb moisture which causes the mixes to cake upon standing. Caking renders the mixes difficult to handle, increases the time required for dissolution and has a strong adverse effect on consumer acceptability.

Attempts have been made to overcome the hygroscopic character of these organic acids by mixing the acid with a protective ingredient or providing acid crystals with a protective coating. For example, see Aeckerle, U.S. Pat. Nos. 2,238,149; Lyons, 2,332,735; Schwarzkopf, 1,811,809; Greif, 2,956,926; Greif, 3,131,068; and Gerfely, 3,663,271. It has also been known to coat organic acids which are only slightly soluble with solubility enhancing additives. See Procyk, U.S. Pat. No. 3,755,529.

However, prior art compositions have not been fully satisfactory. Some provided insufficient protection against caking. Others hindered the dissolution of the organic acid when the composition was added to water. Still others left unsightly residues in the form of floating scums or precipitates which settle out from the solution which adversely affected consumer acceptability. Some imparted undesirable taste factors. It would be highly desirable if an organic acid composition could be provided which would not be subject to these disadvantages.

OBJECTS OF THE INVENTION

Accordingly, it is an object of the present invention to provide a granular food ingredient composition which is non-caking.

Another object of the present invention is to provide a granular food ingredient composition which has an extended shelf life when incorporated in powdered food mixes.

A further object of the present invention is to provide an organic acid composition in the form of a readily handled granular material.

Yet another object of the present invention is to provide a normally hygroscopic food ingredient composition which is protected against absorption of atmospheric moisture.

It is a further object of the present invention to provide a coated food ingredient composition which is useful as an acidulant, flavoring agent or preservative.

Another object of the present invention is to provide a coated food ingredient composition which will quickly dissolve when added to aqueous medium.

A further object of the present invention is to provide an organic acid composition which does not leave an unsightly residue when dissolved in aqueous medium.

A further object of the present invention is to provide organic acid particles coated with a protective coating which is nonreactive with the organic acid.

It is also an object of the present invention to provide a coated food ingredient composition which does not impart undesirable taste factors to food compositions.

SUMMARY OF THE INVENTION

These and other objects of the invention are achieved by providing a non-caking granular food ingredient composition comprising core particles of finely divided, water-soluble food ingredient material such as an organic acid and a continuous encapsulating coating surrounding said core particles, said coating consisting essentially of 5–37% of a fatty acid derivative selected from the group consisting of polyoxyethylene sorbitan monooleate, polyoxyethylene sorbitan monostearate and lecithin; 15–56% propylene glycol and 38–62% flow promoter.

An important characteristic of such materials is rapid dissolution when added to aqueous medium. Failure to dissolve sufficiently rapidly will result in the product being unacceptable to consumers. Satisfactory solubility requires compositions which dissolve at least 90% in approximately one minute or less after they are added to an excess of water at ambient temperatures with mild stirring. Acceptable shelf life requires the product to be storable for up to a year or more without formation of hard clumps. The presence of a floating scum, a visible precipitate or an undesirable taste factor also will negate consumer acceptability.

DETAILED DESCRIPTION OF PREFERRED EMBODIMENTS

It has now been found that if core particles of a food ingredient such as a normally hygroscopic soluble acid are provided with a specific coating consisting essentially of 5–37% a fatty acid derivative selected from the group consisting of polyoxyethylene sorbitan monooleate, polyoxyethylene sorbitan monostearate and lecithin; 15–56% propylene glycol and from 38–62% flow agent, the resulting particles are stable and non-caking over long periods of exposure to the atmosphere and are substantially instantaneously soluble when added to water.

The invention is applicable to any water-soluble ingredients of food compositions which deteriorate upon exposure to the atmosphere. Common ingredients to which the invention is particularly applicable include normally hygroscopic water-soluble organic acids such as citric acid, malic acid, tartaric acid, gluconic acid and ascorbic acid. Minor proportions of less soluble acids such as fumaric acid, adipic acid or succinic acid may also be incorporated in the core particles. The invention is also applicable to water-soluble coloring agents and flavoring agents which degrade or oxidize upon exposure to air.

The permissible size of the core particles may vary somewhat depending on the solubility and other characteristics of the core material. Generally, the more soluble the material, the larger the particles may be. Excessive fineness should be avoided so that problems with dusting and the like will not occur. Typical core particles will range between about 40 and about 850 microns in size.

Polyoxyethylene sorbitan monooleate, polyoxyethylene sorbitan monostearate and lecithin; are well known, commercially available surface active agents. Polyoxyethylene sorbitan monooleate and monostearate are known generally in the art as Polysorbate-80 and Polysorbate 60, respectively. Suitable material may be purchased from Atlas Chemical Industries under the trademarks TWEEN-80 and TWEEN-60. Generally, the polyoxyethylene chain will be formed from about 20 mols of ethylene oxide per mol of sorbitol in order to provide the desired solubility characteristics. The use of lecithin, the oleate ester or the sterate ester in accordance with the invention is critically important. Use of other fatty acid derivatives have not been found to provide the needed solubility despite their surface active properties. While using any of these three materials, or mixtures thereof, will achieve the objects of the invention, the coating procedure proceeds more easily with the normally liquid polyoxyethylene sorbitan monooleate. That at least equivalent performance is achieved when using a liquid coating agent is surprising.

Propylene glycol, sometimes referred to as 1,2-propanediol, also is a well known commercially available chemical.

The coating composition also incorporates a flow promoter. Since both the operable polyoxyethylene sorbitan monoesters and the propylene glycol are liquids at ordinary ambient temperatures, the flow promoter is necessary to prevent the coated acid crystals from adhering to each other, thereby facilitating handling of the material. A preferred material is fumed silica which is usually derived from gels of colloidal silicon dioxide. Particle sizes are extremely small ranging from approximately 0.007 to approximately 0.014 microns. However, the fumed silica has an extremely high surface area on the order of 200–400 square meters per gram. A particularly suitable fumed silica is commercially available from Cabot Corporation under the trademark CAB-0-SIL M-5. Carboxymethyl cellulose is also useful as a flow promoter.

The materials used in the coatings of the present invention are generally non-reactive toward the food ingredients to which they are applied so that the stability of the food ingredient is not adversely affected by the coating.

The coating can be applied to the acid particles by any of several well known methods. A particularly suitable method is to mix the polyoxyethylene sorbitan monoester or lecithin and the propylene glycol together and to spray the resulting liquid mixture onto a bed of acid particles in a pan coater. After all of the liquid mixture has been sprayed on the particles, the fumed silica is added and agitation of the mixture is continued for 5 to 10 minutes to assure thorough distribution of the silica.

Alternatively, the fumed silica can be added to the particle mixture at periodic intervals as the liquid ingredients are sprayed on the acid particles.

It is important that a continuous coating be formed surrounding each acid particle in order to provide adequate protection of the hygroscopic acid crystals against atmospheric moisture.

The proportion of coating in the coated particles may range from 5 to 80%. Preferably the coating will constitute between 10 and 50% of the weight of the resulting particle.

As soon as the coating has been applied and uniform mixing has been achieved, the resulting particles are ready for incorporation into any desired composition such as a gelatin desert mix or a powdered beverage mix in the conventional manner.

The particular combination of ingredients produces a truly synergistic result in which the core particles of organic acid are strongly protected against caking or degradation due to take-up of atmospheric moisture or oxidation while at the same time the coated organic acid particles are practically instantaneously soluble so that they will dissolve substantially completely in less than one minute when added to an excess of water with mild stirring. Moreover, the coating of the invention does not impart any unsightly residue to the mixture although a temporary, slightly milky or snowy effect may be observed at the outset of mixing. The snowiness disappears by itself upon standing for 5 minutes or less. The coating leaves no visible scum or grainy precipitate. No adverse taste factors are imparted to the composition.

Further details of the invention will be apparent from a consideration of the following examples.

EXAMPLE I

Samples of granular citric acid were encapsulated as follows and enclosed in sealed polyethylene bags. The bag samples were then exposed to a temperature of 90° F. at a relative humidity of 30% for 24 hours. The results of the tests are shown in Table I. The A coating comprised 1 part of the fatty acid derivative, 3 parts propylene glycol and 4 parts fumed silica flow promoter. Coating A-1 contained polyoxyethylene sorbitan monooleate, coating A-2 contained polyoxyethylene sorbitan monostearate and coating A-3 contained lecithin. The B coatings contained the same amounts of the same fatty acid derivative as the similarly numbered A coatings and also comprised 4 parts propylene glycol and 4 parts fumed silica. The C coatings comprised 2 parts of the fatty acid derivative identified in the correspondingly numbered A and B coatings, 2 parts propylene glycol and 4 parts fumed silica flow promoter. An uncoated control sample was also provided. Flow was determined by pouring the granular material out of the bag. This test shows the effectiveness of coatings A and C which were formulated according to the present invention in preventing caking of the hygroscopic organic acid particles.

TABLE I

| Coating | Flow | Appearance | Caking |
|---------|------|------------|--------|
| A-1 | Excellent | Dry | None |
| A-2 | " | " | " |
| A-3 | " | " | " |
| B-1 | Fair - some sticking to bag | Wet | Moderate-Slight |
| B-2 | Fair - some sticking to bag | " | Moderate-Slight |
| B-3 | Fair - some sticking to bag | " | Moderate-Slight |
| C-1 | Excellent | Dry | None |
| C-2 | " | " | " |
| C-3 | " | " | " |
| Control | Would not flow | Very Wet | Completely Caked |

EXAMPLE II

The procedure of Example I was repeated except that the temperature fluctuated between 110° F. and 118° F. The results of the tests were the same as in Example I.

EXAMPLE III

Granular citric acid crystals were provided with the same coatings used in Example I, and two 20 gram samples of each material were placed in open dishes at 70° F. and 79% relative humidity. The first sample of each material was checked after 24 hours and the second after 48 hours. The samples in each of the dishes were examined to determine the effect of atmospheric moisture on the granular material. Flow was determined by tilting the open dish and observing the movement, if any, of the granular material.

TABLE II

| Coating | Time (hours) | Appearance | Flow | Caking |
|---|---|---|---|---|
| A-1 | 24 | slightly wet | good | slight |
| A-2 | 24 | " | " | " |
| A-3 | 24 | " | " | " |
| A-1 | 48 | slightly wet | good | slight |
| A-2 | 48 | " | " | " |
| A-3 | 48 | " | " | " |
| B-1 | 24 | " | would not flow | completely caked |
| B-2 | 24 | " | " | " |
| B-3 | 24 | " | " | " |
| B-1 | 48 | very wet | " | " |
| B-2 | 48 | " | " | " |
| B-3 | 48 | " | " | " |
| C-1 | 24 | slightly wet | good | slight |
| C-2 | 24 | | | |
| C-3 | 24 | | | |
| C-1 | 48 | slightly wet | good | slight |
| C-2 | 48 | " | " | slight |
| C-3 | 48 | " | " | slight |
| Control | 24 | very wet | would not flow | completely caked |
| Control | 48 | " | " | " |

As can be seen from the Table the acid particles provided with coating according to the present invention retained their flowability so that they were readily poured out of the dish while the uncoated acid particles and those provided with the propylene glycol coating were completely caked and could not be poured out of the dish at all.

EXAMPLE IV

Granular citric acid crystals were provided with a coating consisting of 35% polyoxyethylene sorbitan monooleate, 15% propylene glycol and 50% fumed silica. Fifteen grams of the resulting coated acid crystals were added to 200 ml of water at 50° C. and stirred vigorously for one minute. At the end of the one minute period, most of the granular material remained undissolved and settled out at the bottom of the container. This test demonstrates the criticality of using enough propylene glycol in the coating.

EXAMPLE V

A sample of granular citric acid crystals was provided with a coating comprising 20% polyoxyethylene sorbitan monooleate, 60% propylene glycol and 20% fumed silica. Two other samples were made, the first employing polyoxyethylene sorbitan monostearate and the second lecithin in place of the monooleate of the first sample. The resulting coated particles in all three samples were tacky and tended to alglomerate. Acid particles provided with these coatings would not flow satisfactorily and were hard to handle. This test demonstrates the importance of adding sufficient flow agent to the coating.

EXAMPLE VI

Granular citric acid crystals were provided with a continuous encapsulating coating consisting essentially of 12½% polyoxyethylene sorbitan monooleate, 37½% propylene glycol and 50% fumed silica. Fifteen grams of the resulting particles were added to 200 millileters of water at 50° C. with stirring. After 30 seconds, no undissolved material would be observed. A slight milkiness at the surface of the liquid disappeared upon allowing the solution to stand for an additional 3 minutes. This test demonstrates the substantially instantaneous solubility of particles provided with coatings according to the present invention.

EXAMPLE VII

The procedure of Example VI was repeated, first substituting polyoxyethylene sorbitan monostearate and their lecithin for the monooleate. The same solubility characteristics were observed.

EXAMPLE VIII

Fifteen gram samples of encapsulated material from Examples VI and VII were added to separate 200 ml quantities water at 5° C. and stirred rapidly. After one minute stirring, only a very small fraction of the acid crystals (estimated to be less than 10%) could be observed in each. After two minutes stirring, no undissolved material was to be seen in the solutions. This test demonstrates the solubility of food ingredient particles provided with coatings according to the present invention, even in cold water.

EXAMPLE IX

A proprietary powdered orange drink mix was formulated utilizing the coated citric acid particles of Examples VI and VII. A control mix also was prepared which was identical in every respect except uncoated citric acid crystals were used. Each mix was sealed in a moisture resistant paper envelope and exposed to ambient temperature and humidity for sixty days. At the end of the test, the control mix had caked to a hard clump which could only be removed from the envelope by completely tearing the envelope apart. The test mixes incorporating citric acid particles coated according to the invention were free flowing and were readily poured from the envelope after tearing off a small corner. The test mixes dissolved almost immediately when added to water while the caked control was dissolved only with difficulty after partial crushing and prolonged stirring.

EXAMPLE X

Beverage mix test samples identical to the samples of Example IX were packaged in paper envelopes and exposed to ambient temperature and humidity for six months. When the envelope was opened there was no sign of caking, and when the mix was added to water and lightly stirred, it dissolved completely in less than thirty seconds without forming any objectionable scum or residue. The resulting beverage had a pleasant, readily palatable taste.

The foregoing examples have been given solely for purposes of exemplification and are not intended to limit the invention. Since modifications of the disclosed embodiments may occur to persons skilled in the art, the scope of the invention is to be limited solely by the scope of the appended claims.

I claim:

1. A non-caking granular food ingredient composition comprising core particles of a normally hygroscopic, water-soluble food ingredient and a continuous encapsulating coating on said core particles consisting essentially of 5–37% of fatty acid derivative selected from the group consisting of polyoxyethylene sorbitan monooleate, polyoxyethylene sorbitan monostearate and lecithin, 15–56% propylene glycol and 38–62% finely divided flow agent.

2. A composition as recited in claim 1 wherein said coating consists essentially of 1 part polyoxyethylene sorbitan monooleate, 3 parts propylene glycol and 4 parts flow agent.

3. A combination as recited in claim 1 wherein said coating consists essentially of 1 part polyoxyethylene monostearate, 3 parts polyethylene glycol and 4 parts flow agent.

4. A combination according to claim 1 wherein said coating consists essentially of 1 part lecithin and 4 parts flow agent.

5. A composition according to claim 1 wherein said flow agent is carboxymethylcellulose.

6. A composition according to claim 1 wherein said flow agent is fumed silica.

7. A composition according to claim 6 wherein said fumed silica has a particle size from 0.007 to 0.014 microns and a surface area of from 200–400 square meters per gram.

8. A composition as recited in claim 1 wherein said food ingredient is an organic acid selected from the group consisting of citric acid, malic acid, tartaric acid, gluconic acid and ascorbic acid.

9. A composition according to claim 8 wherein said acid is citric acid.

10. A composition according to claim 1 wherein said food ingredient comprises a minor proportion of a sparingly soluble acid selected from the group consisting of fumaric acid, adipic acid and succinic acid.

11. A composition according to claim 1 wherein the coating comprises from 5 to 75 percent by weight of the coated particles.

12. A composition according to claim 6 wherein the coating comprises from 10 to 50 percent of the weight of the coated particles.

13. A powdered beverage mix comprising the coated food ingredient particles of claim 1.

14. A powdered gelatin dessert mix comprising the coated food ingredient particles of claim 1.

* * * * *

UNITED STATES PATENT AND TRADEMARK OFFICE
CERTIFICATE OF CORRECTION

PATENT NO. : 4,288,460

DATED : September 8, 1981

INVENTOR(S) : Paul Ciliberto and Stanley Kramer

It is certified that error appears in the above—identified patent and that said Letters Patent is hereby corrected as shown below:

On The Title Page and column 1, title of invention should read -- Non-Caking, Water Soluble, Granular Food Ingredient --.

Column 5, Table II should read as shown on the attached sheet.

UNITED STATES PATENT AND TRADEMARK OFFICE
CERTIFICATE OF CORRECTION

PATENT NO. : 4,288,460

DATED : September 8, 1981

INVENTOR(S) : Paul Ciliberto and Stanley Kramer

It is certified that error appears in the above—identified patent and that said Letters Patent is hereby corrected as shown below:

TABLE II

| Coating | Time (hours) | Appearance | Flow | Caking |
|---|---|---|---|---|
| A-1 | 24 | slightly wet | good | slight |
| A-2 | 24 | " " | " | " |
| A-3 | 24 | " " | " | " |
| A-1 | 48 | slightly wet | good | slight |
| A-2 | 48 | " " | " | " |
| A-3 | 48 | " " | " | " |
| B-1 | 24 | very wet | would not flow | completely caked |
| B-2 | 24 | " " | " | " |
| B-3 | 24 | " " | " | " |
| B-1 | 48 | very wet | would not flow | completely caked |
| B-2 | 48 | " " | " | " |
| B-3 | 48 | " " | " | " |
| C-1 | 24 | slightly wet | good | slight |
| C-2 | 24 | " " | " | " |
| C-3 | 24 | " " | " | " |
| C-1 | 48 | slightly wet | good | slight |
| C-2 | 48 | " " | " | " |
| C-3 | 48 | " " | " | " |
| Control | 24 | very wet | would not flow | completely caked |
| Control | 48 | very wet | would not flow | completely caked |

Signed and Sealed this

Eighth Day of December 1981

[SEAL]

Attest:

Attesting Officer

GERALD J. MOSSINGHOFF

Commissioner of Patents and Trademarks